(12) United States Patent
Takayama

(10) Patent No.: US 6,570,729 B1
(45) Date of Patent: May 27, 2003

(54) RECORDING MEDIUM AND TAPE DRIVE APPARATUS THAT CALCULATES AVAILABLE PARTITION RECORDING AREA USING MAXIMUM FRAME NUMBER INFORMATION STORED IN A MEMORY-IN-CASSETTE

(75) Inventor: Yoshihisa Takayama, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/449,628

(22) Filed: Nov. 30, 1999

(30) Foreign Application Priority Data

Dec. 1, 1998 (JP) .......................................... 10-341524

(51) Int. Cl.⁷ ............................................. G11B 27/11
(52) U.S. Cl. ......................................... 360/69; 360/71
(58) Field of Search .................... 360/69, 71, 72.1, 360/132; 711/153, 161, 170, 173

(56) References Cited

U.S. PATENT DOCUMENTS 5,852,534 A * 12/1998 Ozue et al. .................. 360/69
5,907,444 A * 5/1999 Oguro ......................... 360/69
6,075,669 A * 6/2000 Takayama ................... 360/69

FOREIGN PATENT DOCUMENTS

JP 63157246 A * 6/1988
JP 07056782 A * 3/1995

* cited by examiner

Primary Examiner—David Hudspeth
Assistant Examiner—James L Habermehl
(74) Attorney, Agent, or Firm—Rader, Fishman & Grauer PLLC; Ronald P. Kananen, Esq.

(57) ABSTRACT

A tape cassette and a tape streamer drive for driving the tape cassette are provided. MAFN data and VMAFN data are defined so as to indicate the maximum frame number of all frames formed in a partition and the maximum frame number of frames in a valid area in the partition, respectively. The MAFN data and the VMAFN data are stored in a MIC disposed in the tape cassette. The size of an available recording area remaining in the partition is calculated from the MAFN data and the VMAFN data. Thus, a powerful technique is achieved for managing the tape cassette used in a data storage application.

6 Claims, 15 Drawing Sheets

| | | |
|---|---|---|
| | DRIVE INITIALIZE PART CHECKSUM | 1 BYTE |
| | MIC LOGICAL FORMAT TYPE | 1 BYTE |
| | ABSOLUTE VOLUME MAP POINTER | 2 BYTES |
| | USER VOLUME NOTE CELL POINTER | 2 BYTES |
| MEMORY MANAGEMENT INFORMATION (FL2) | USER PARTITION NOTE CELL POINTER | 2 BYTES |
| | PARTITION INFORMATION CELL POINTER | 2 BYTES |
| | RESERVED | 1 BYTE |
| | VOLUME ATTRIBUTE FLAGS | 1 BYTE |
| | FREE POOL TOP ADDRESS | 2 BYTES |
| | FREE POOL BOTTOM ADDRESS | 2 BYTES |

FIG. 10

| | | |
|---|---|---|
| VOLUME TAG (FL3) | VOLUME INFORMATION CHECKSUM | 1 BYTE |
| | VOLUME INFORMATION | 100 BYTES |
| | ACCUMULATIVE PARTITION INFORMATION CHECKSUM | 1 BYTE |
| | ACCUMULATIVE PARTITION INFORMATION | 56 BYTES |
| | VOLUME NOTE CHECKSUM | 1 BYTE |
| | VOLUME NOTE | 8 BYTES |
| | CARTRIDGE SERIAL NUMBER | 32 BYTES |
| | MANUFACTURER ID | 1 BYTE |
| | SECONDARY ID | 1 BYTE |
| | CARTRIDGE SERIAL NUMBER PART CHECKSUM | 1 BYTE |
| | RESERVED | 1 BYTE |
| | SPECIFIC VOLUME TAG 1 | 36 BYTES |
| | SPECIFIC VOLUME TAG 2 | 36 BYTES |
| | SPECIFIC VOLUME TAG 3 | 36 BYTES |
| | SPECIFIC VOLUME TAG 4 | 36 BYTES |
| | SPECIFIC VOLUME TAG 5 | 36 BYTES |
| | SPECIFIC VOLUME TAG 6 | 36 BYTES |
| | SPECIFIC VOLUME TAG 7 | 36 BYTES |
| | SPECIFIC VOLUME TAG 8 | 36 BYTES |
| | SPECIFIC VOLUME TAG 9 | 36 BYTES |
| | SPECIFIC VOLUME TAG 10 | 36 BYTES |
| | SPECIFIC VOLUME TAG 11 | 36 BYTES |
| | SPECIFIC VOLUME TAG 12 | 36 BYTES |
| | SPECIFIC VOLUME TAG 13 | 36 BYTES |

FIG. 13

| | | | |
|---|---|---|---|
| PREVIOUS GROUPS WRITTEN | | 4 BYTES | |
| TOTAL GROUPS WRITTEN | | 4 BYTES | |
| RESERVED | | 1 BYTE | |
| PREVIOUS GROUPS READ | | 3 BYTES | |
| TOTAL GROUPS READ | | 4 BYTES | |
| RESERVED | | 1 BYTE | |
| TOTAL REWRITTEN FRAMES | | 3 BYTES | |
| RESERVED | | 1 BYTE | |
| TOTAL 3RD ECC COUNT | | 3 BYTES | |
| ACCESS COUNT | | 4 BYTES | |
| UPDATE REPLACE COUNT | | 4 BYTES | |
| PREVIOUS REWRITTEN FRAMES | | 2 BYTES | 48 BYTES |
| PREVIOUS 3RD ECC COUNT | | 2 BYTES | |
| RESERVED | | 1 BYTE | |
| LOAD COUNT | | 3 BYTES | |
| RESERVED | | 1 BYTE | |
| VALID MAXIMUM ABSOLUTE FRAME COUNT | | 3 BYTES | |
| FLAG BYTE | BIT 1 | PREVENT WRITE | 1 BYTE |
| | BIT 2 | PREVENT READ | |
| | BIT 3 | PREVENT WRITE RETRY | |
| | BIT 4 | PREVENT READ RETRY | |
| | BIT 5 | RESERVED | |
| | BIT 6 | RESERVED | |
| | BIT 7 | RESERVED | |
| | BIT 8 | PARTITION IS OPENED | |
| MAXIMUM ABSOLUTE FRAME COUNT | | 3 BYTES | |

FIG. 14

| LINK INFORMATION | 8 BYTES |
|---|---|
| SUPER HIGH SPEED SEARCH MAP | |

RECORDING MEDIUM AND TAPE DRIVE APPARATUS THAT CALCULATES AVAILABLE PARTITION RECORDING AREA USING MAXIMUM FRAME NUMBER INFORMATION STORED IN A MEMORY-IN-CASSETTE

BACKGROUND OF THE INVENTION

1. Field of the Invention

The present invention relates to a recording medium used in data storage applications or the like, and also to a tape drive apparatus for driving a tape medium in the form of a tape cassette.

2. Description of the Related Art

It is known in the art to use a tape streamer drive as a drive apparatus for recording and reproducing digital data onto or from a magnetic tape. A typical tape streamer drive has a storage capacity as large as several tens GB to several hundred GB depending on the length of a tape serving as a recording medium disposed in a tape cassette. Because of such a huge storage capacity, tape streamer drives are widely used to keep a backup copy of data stored on a medium such as a hard disk of a computer. Tape streamer drives are also advantageously used to store data with a large data size such as image data.

One known specific tape streamer drive records or reproduces data onto or from an 8-mm VTR tape cassette serving as a recording medium by means of a helical scanning technique using a rotating head.

When data is recorded or reproduced onto or from a tape cassette by the above-described tape streamer drive, preformatting is performed on a magnetic tape of the tape cassette so as to divide the magnetic tape into a plurality of partitions. A data is formed in each partition, and user data is recorded or reproduced into or from the data area.

Referring to FIG. 17, formatting of the magnetic tape and updating of data in a partition performed by the tape streamer drive are briefly described below.

FIG. 17(a) illustrates a part of a magnetic tape in which a partition with a partition number #N and a following partition with a partition number #(N+1) are formed.

A reference/system area is formed at the beginning of each partition #N and #(N+1), as shown in the figure. The reference/system area is used to store information describing the history of use of the magnetic tape and the present partition and also used to store management information required in a recording/reproducing operation. More specifically, the tape streamer drive reads the information described in the reference/system area at the beginning of each partition and controls the operation of recording or reproducing data into or from that partition in accordance with the information described in the reference/system area.

Following the reference/system area, there is provided a data area used to record and reproduce user data. Following the end of the data area, there is placed an EOD (End of Data) code indicating the end of the partition.

In the example shown in FIG. 17(a), an EOD code is placed at the end of each partition with the partition number N or (N+1). This means that the entire recording areas of both partitions are filled with data.

In the magnetic tape shown in FIG. 17(a), data is recorded or reproduced track by track by helical-scanning the magnetic tape using a rotating head. The magnetic tape is formatted such that two adjacent tracks form one frame.

Frame numbers are assigned to the respective frames in each partition such that the frame number increases from the beginning of the partition (beginning of the reference/system area) toward the end of the partition (just before the beginning of the next partition). That is, in the case of the partition #N, successive ascending frame numbers are given to respective frames successively formed in an area from a tape position Pst to a tape position Pend.

Maximum frame number information indicating the number of frames formed in the present partition is stored in the reference/system area of this partition.

Note that, for simplicity of illustration, the format shown in FIG. 17(a) is slightly different from the actually used format of the magnetic tape.

When a magnetic tape in the state shown in FIG. 17(a) is given, data in the partition #N may be updated (rewritten), for example, in such a manner that updating of data is started from the beginning of the data area in the partition #N and completed at a data location Prw shown in FIG. 17(b).

At a location following the position at which the writing of data is completed, a new EOD code is placed so as to indicate that the end position of a new valid area of the partition #N is at the position Pnw on the tape.

As can be seen from FIG. 17, the data writing end position indicated by the position Prw on the tape is located before the position at which the data end position was located before updating the data. In this case, the size of the remaining available recording area in the partition #N is given by the sum of the size of a hatched data area and the size of one EOD area.

Because the maximum frame number is described in the reference/system area as described earlier, it is possible to identify the end position of the present partition in units of frames. However, there is no information indicating the end position of the valid data area in the present partition, that is, the tape position Pap in the recording status shown in FIG. 17(b).

Therefore, when data is rewritten from the status shown in FIG. 17(a) into the status shown in FIG. 17(b), it becomes impossible, by using the information stored in the reference/system area, to manage the data area, denoted by means of hatching in FIG. 17(b), located following the end position (Pap) of the valid area.

When an area which cannot be managed is created, a problem can occur as described below.

For example, when a user wants to know the size of an available recording area remaining in a certain partition, it is impossible to calculate the size of the remaining available recording area because the remaining available recording area cannot be managed. This means that the conventional tape streamer drive can have a problem in managing the tape cassette, depending on the recording status because there is no information indicating the end position of the valid area of the present partition (wherein the end position of the valid area can indicate the size of the remaining available recording area).

SUMMARY OF THE INVENTION

In view of the above, it is an object of the present invention to provide a more powerful technique of managing a tape cassette employed in a data storage application. More specifically, it is an object of the present invention to provide a technique which makes it possible to manage the remaining available recording area in each partition.

According to an aspect of the present invention, there is provided a recording medium comprising: a tape cassette including a magnetic tape disposed therein; and a memory disposed in the tape cassette, for storing management information used to manage recording or reproducing data onto or from the magnetic tape, wherein the memory includes a memory area for storing: first unit recording area number information indicating the maximum number of successive numbers assigned to unit recording areas of each partition when one or more partitions including successive unit recording areas with a predetermined fixed length are formed on the magnetic tape; and second unit recording area number information indicating the maximum number of successive numbers assigned to unit recording areas forming a valid area in a partition in which valid data is recorded.

According to another aspect of the present invention, there is provided a tape drive. apparatus comprising tape drive means for recording or reproducing information onto or from a magnetic tape when a tape cassette includes the magnetic tape disposed therein is loaded; and memory drive means for reading or writing management information from or into a memory if the loaded tape cassette includes the memory for storing management information used to manage recording or reproducing data onto or from the magnetic tape, wherein the memory stores first unit recording area number information indicating the maximum number of successive numbers assigned to unit recording areas of each partition when one or more partitions including successive unit recording areas with a predetermined fixed length are formed on the magnetic tape; and second unit recording area number information indicating the maximum number of successive numbers assigned to unit recording areas forming a valid area in a partition in which valid data is recorded. Preferably, in response to receiving an external command, the memory drive means reads the first unit recording area number information and the second unit recording area number information associated with a particular partition from the memory.

According to the present invention, as described above, the memory disposed in the tape cassette stores management information including first unit recording area number information indicating the maximum number of successive numbers assigned to unit recording areas of each partition, and second unit recording area number information indicating the maximum number of successive numbers assigned to unit recording areas forming a valid area in a partition.

Thus, it becomes possible to manage recording areas in the respective partitions other than the valid recording areas using the management information for each unit of recording area.

Furthermore, because information is stored in the MIC, it is possible to quickly obtain information compared with the case in which all information is stored in a management area on the magnetic tape. When information is acquired by reading the management area on the magnetic tape, it is required to move the magnetic tape until it becomes possible to access the management area. In contrast, there is no need to move the magnetic tape in the case where information is read from the MIC.

Furthermore, because the size of a remaining available recording area of a particular partition can be calculated using the first and second unit recording area number information, it is possible to improve the ease of use.

If a frame is employed as the unit recording area, it is possible to calculate the size of a remaining available recording area with an accuracy corresponding to the data length of one frame and thus it is possible to manage the remaining available recording area with the same accuracy.

BRIEF DESCRIPTION OF THE DRAWINGS

FIG. 10 is a schematic diagram illustrating a volume tag of the MIC according to the embodiment of the invention;

FIG. 13 is a schematic diagram illustrating partition information of the MIC according to the embodiment of the invention;

FIG. 14 is a schematic diagram illustrating a super high speed search map cell of the MIC according to the embodiment of the invention;

DESCRIPTION OF THE PREFERRED EMBODIMENT

Figure 1:
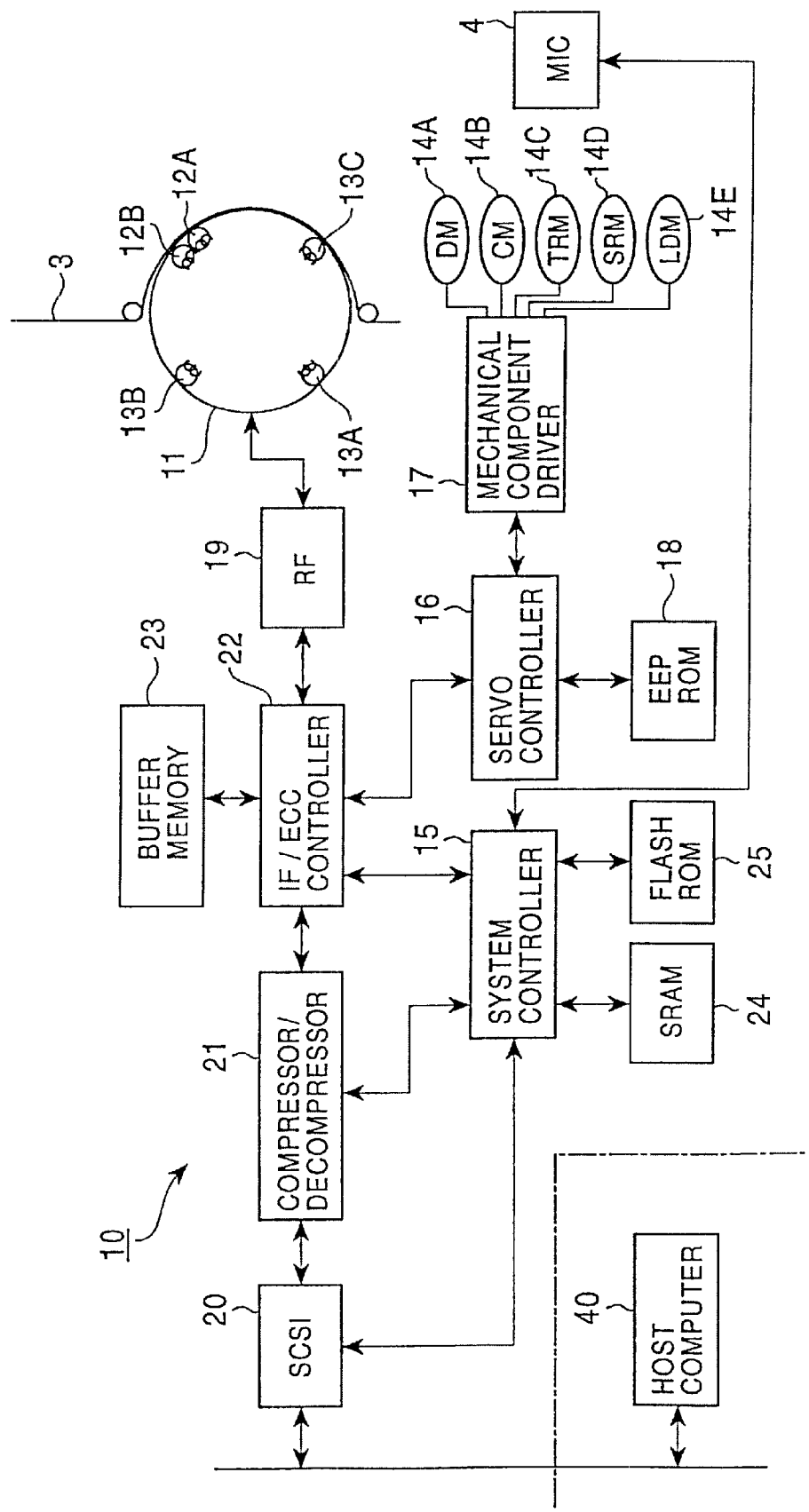
FIG. 1 is a block diagram of an embodiment of a tape streamer drive according to the present invention.

The present invention is described in further detail below with reference to preferred embodiments.

The inventors of the present invention have proposed a tape cassette including a nonvolatile memory and have also proposed a tape drive apparatus used to form a data storage system capable of recording and reproducing digital data onto or from the above-described tape cassette including the memory. The present invention is applied to the data storage system which operates in conjunction with the tape cassette including the memory. Hereinafter, the nonvolatile memory disposed in the tape cassette will be referred to as an MIC (memory in cassette).

The description is given below in the following order.
1. Construction of tape cassette
2. Construction of tape streamer drive
3. Data structure of magnetic tape
4. Data structure of MIC
5. Management of remaining available recording area
6. Example of operation of transmitting information indicating the size of a remaining available recording area 1. Construction of Tape Cassette A tape cassette having an MIC which is used in conjunction with a tape streamer drive according to the present embodiment is first described.

Figure 2:
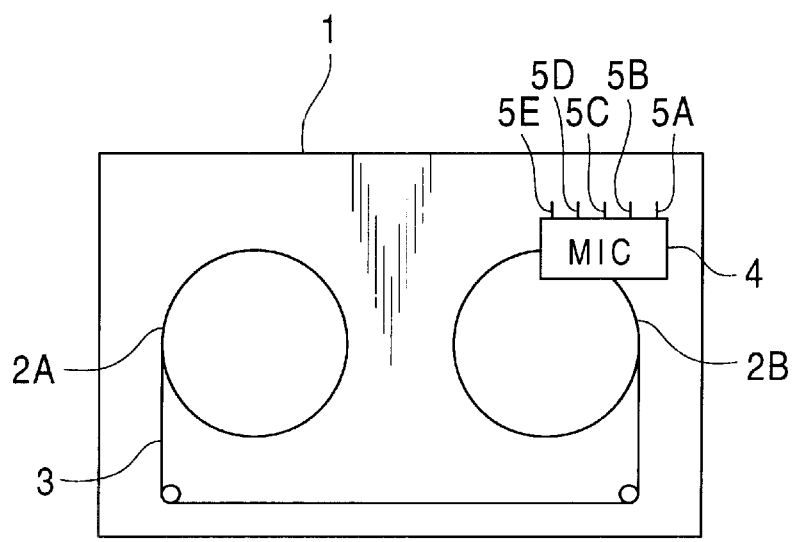
FIG. 2 is a schematic diagram illustrating the internal structure of a tape cassette according to an embodiment of the invention.

FIG. 2 is a schematic diagram illustrating the internal structure of the tape cassette. Reel hubs 2A and 2B are disposed inside the tape cassette 1, and a magnetic tape 3 with a width of 8 mm extends between these reel hubs 2A and 2B and both end portions are wound around the respective reel hubs 2A and 2B.

An MIC 4 serving as a nonvolatile memory is disposed in the tape cassette 1. The MIC module 4 includes five terminals 5A, 5B, 5C, 5D, and 5E which serve as a power supply terminal, a data input terminal, a clock input terminal, a ground terminal, and an auxiliary terminal, respectively. As will be described in further detail later, the MIC 4 stores information indicating the date and location of manufacture, thickness and length of the tape, and the tape material for each tape cassette and also stores information as to the history of use for each partition formed on the tape 3 and user information. Herein, various kinds of information stored in the MIC 4 will also be referred to as management information.

Figure 3:
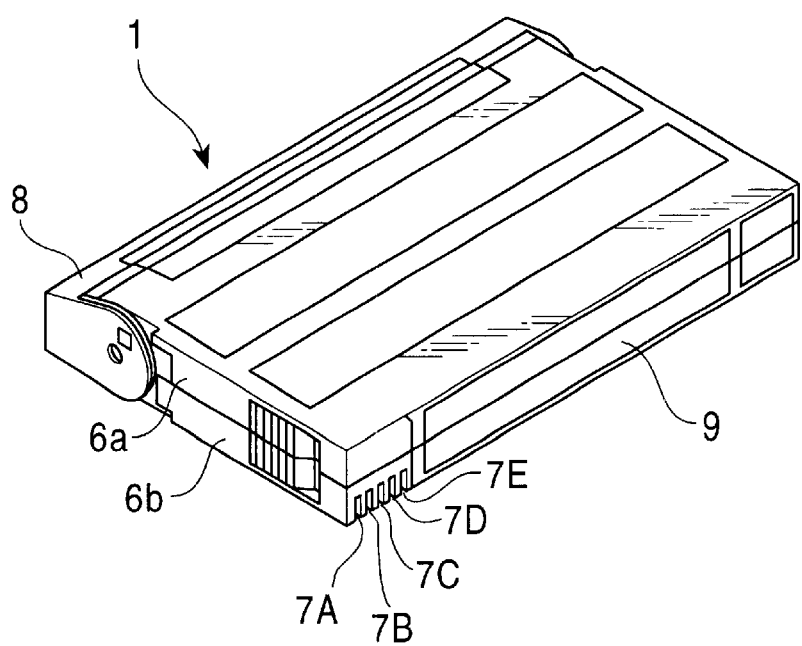
FIG. 3 is a perspective view illustrating the external appearance of the tape cassette according to the embodiment of the invention.

FIG. 3 illustrates an example of an outer structure of the tape cassette 1. As shown in FIG. 3, like tape cassettes widely used for 8 mm VTRs, the case of the tape cassette 1 is composed of an upper case 6a, a lower case 6b, and a guard panel 8. The tape cassette 1 has a label face 9 on one side thereof. Terminal pins 7A, 7B, 7C, 7D, and 7E are formed on the label face 9 so that they can be coupled with the respective terminals 5A, 5B, 5C, 5D, and 5E described above with reference to FIG. 2. More specifically, in the present embodiment, data is transmitted between the tape cassette 1 and a tape streamer drive 10, which will be described later, via the terminal pins 7A, 7B, 7C, 7D, and 7E in physical contact with the tape streamer drive 10.

2. Construction of Tape Streamer Drive

Referring to FIG. 1, the construction of the tape streamer drive 10 according to the present embodiment is described below. This tape streamer driver 10 is designed to record and reproduce data upon or from a magnetic tape 3 of a tape cassette 1 loaded in the driver 10 by helical-scanning the magnetic tape 3.

On a rotating drum 11, there are provided two recording heads 12A and 12B with different azimuth angles and three reproducing heads 13A, 13B, and 13C with predetermined azimuth angles, wherein these heads are located at predetermined angular intervals.

The magnetic tape 3 is partly drawn out of the tape cassette 1 and wound around the rotating drum 11, which is rotated by a drum motor 14A.

There is also provided a capstan (not shown) which is driven by a capstan motor 14B so that the magnetic tape 3 runs at a fixed speed.

The reel hubs 2A and 2B in the tape cassette 1 are separately driven by reel motors 14C and 14D, respectively, to be rotated in forward and reverse directions, respectively.

A loading motor 14E drives a loading mechanism (not shown) to load/unload the magnetic tape 3 around/from the rotating drum 11.

The drum motor 14A, the capstan motor 14B, the reel motors 14C and 14D, and the loading motor 14E are driven to rotate by electric power supplied from a mechanical component driver 17. The mechanical component driver 17 drives the respective motors under the control of a servo controller 16. The servo controller 16 controls the rotational speed of the respective motors so as to control the running of the tape during a normal recording/reproducing operation or during a high-speed reproducing operation, the running of the tape in a fast-forwarding or fast-reversing mode, the operation of loading the tape cassette, the loading/unloading operation, and the operation of controlling the tape tension.

Although not shown in the figure, an FG (frequency generator) is formed on each of the drum motor 14A, the capstan motor 14B, the reel motors 14C and 14D so that the servo controller 16 can perform servo control on the respective motors in accordance with rotational information detected via the FGs.

The servo controller 16 detects the error of rotation of each motor with respect to the target rotational speed by detecting the rotational speed of each motor from FG pulses. The servo controller 16 adjusts electrical power applied to each motor via the mechanical component driver 17 by an amount corresponding to the detected error so as to control the rotational speed via a closed-loop control system thereby controlling the rotational speeds of the respective motors with respect to the target speeds during operations in the normal recording/reproducing mode, high-speed searching mode, fast-forwarding mode, and fast-reversing mode.

Parameters used by the servo controller 16 to perform servo control on the respective motors are stored in an EEP-ROM 18.

The servo controller 16 is bidirectionally connected to a system controller 15 via an interface controller/ECC formatter (hereinafter referred to as an IF/ECC controller) 22 wherein the system controller 15 is responsible for controlling operations of the entire system.

In the tape streamer drive 10, data is input and output via a SCSI interface 20. More specifically, when data is recorded, data is sequentially input record by record from a host computer 40 to the tape streamer drive 10 via the SCSI interface 20 and supplied to a compressor/decompressor 21, wherein the record is a unit of data with a fixed length. In the tape streamer drive system described above, there is also a mode in which data is transmitted from the host computer 40 in variable-length data units.

The compressor/decompressor 21 compresses, if necessary, the input data in accordance with a predetermined method. In the case where data is compressed in accordance with the LZ compression technique, character strings which have been processed in the past are assigned particular codes and stored in a dictionary. In this technique, each character string in the input data is compared with the contents of the dictionary, and if the character string is found in the dictionary, the character string is replaced with the corresponding code found in the dictionary. If the character string is not found in the dictionary, a new code is assigned to that character string and registered in the dictionary. In the LZ technique, as described above, compression is performed by replacing character strings in the input data with corresponding codes registered in the dictionary.

The output of the compressor/decompressor 21 is supplied to the IF/ECC controller 22. The IF/ECC controller 22 temporarily stores the received data into a buffer memory 23. The data stored in the buffer memory 23 is then read by the IF/ECC controller 22 and converted into a form consisting of units called groups each having a fixed data length corresponding to forty tracks of a magnetic tape. The data is then subjected to ECC formatting.

In the ECC formatting process, an error correction code is added to the data to be recorded, and the data is modulated into a form suitable for the recording process. The resultant data is supplied to an RF processing unit 19.

The RF processing unit 19 generates a recording signal by performing amplification and recording equalization on the received data and outputs the recording signal to a recording heads 12A and 12B. Thus, the recording heads 12A and 12B record the data on the magnetic tape 3.

The operation of reproducing data is briefly described below. The data recorded on the magnetic tape 3 is read as a reproduced RF signal via the reproducing heads 13A and 13B. The reproduced signal is applied to the RF processing unit 19 and subjected to reproducing equalization, reproducing clock signal generation, binarization, and decoding (in accordance with, for example, the Viterbi decoding technique).

The resultant signal is then supplied to the IF/ECC controller 22 and subjected to an error correction process. The data is then temporarily stored in the buffer memory 23 and is read at a predetermined time and supplied to the compressor/decompressor 21.

If the system controller 15 determines that the data has been compressed by the compressor/decompressor 21 during the recording process, the compressor/decompressor 21 decompresses the data. However, the data is directly output from the compressor/decompressor 21 without being decompressed, if the data is non-compressed data.

The data output from the compressor/decompressor 21 is output as reproduced data to the host computer 40 via the SCSI interface 20.

FIG. 1 also shows the MIC 4 together with the magnetic tape 3 of the tape cassette 1. When the tape cassette 1 is loaded on the tape streamer drive 10, the MIC 4 is connected to the system controller 15 via the terminal pins shown in FIG. 3 so that data can be transmitted between the MIC 4 and the system controller 15 thereby making it possible for the system controller 15 to read management information from the MIC 4 and update the management information as required.

Transmission of information between the MIC 4 and the external host computer 40 is performed using SCSI commands. Therefore, data can be transmitted between the tape cassette 1 and the host computer 40 via the SCSI interface without having to provide a dedicated line between the MIC 4 and the host computer 40.

As described above, although transmission of information between the tape streamer drive 10 and the host computer 40 is performed using the SCSI interface 20, communication with the system controller 15 is performed by the host computer 40 using SCSI commands.

More specifically, the host computer 40 issues SCSI commands to the system controller 15 to perform recording/reproducing data into or from the MIC 4.

Data used by the system controller 15 to perform various processes is stored in an S-RAM 24 and a flash ROM 25.

More specifically, the flash ROM 25 stores parameters associated with processes, and the S-RAM 24 is used as a work memory and also as a memory for storing data read from the MIC 4, data to be written into the MIC 4, data indicating the mode set for each tape cassette, various flag data, and data used during processes.

The S-RAM 24 and the flash ROM 25 may also be constructed in the form of internal memory in a microcomputer forming the system controller 15. Alternatively, a part of the buffer memory 23 may be used as a work memory.

3. Data Structure of Magnetic Tape

The format of data recorded or reproduced by the tape streamer drive 10 onto or from the magnetic tape 3 in the tape cassette 1 is now described briefly.

Figure 4:
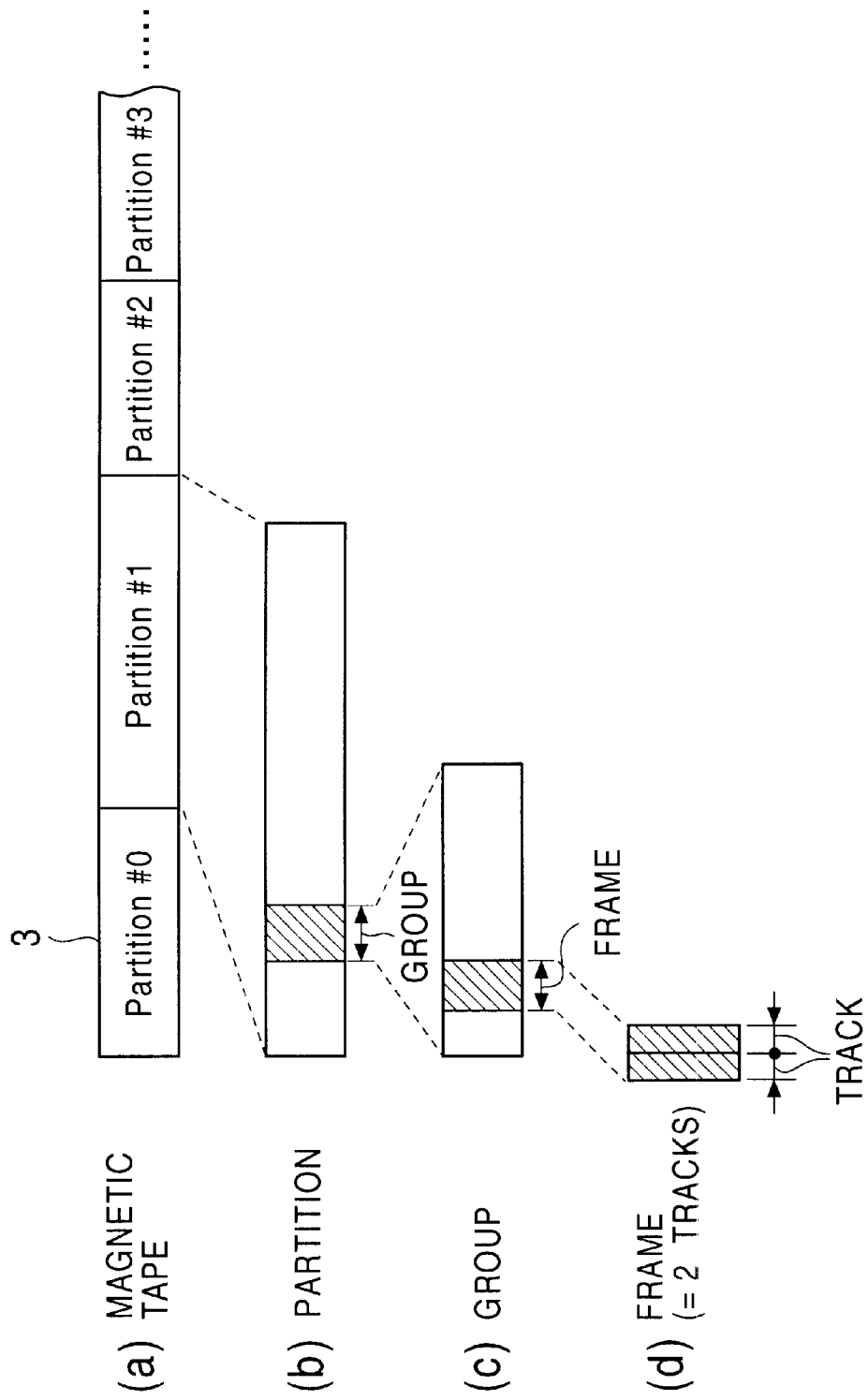
FIG. 4 is a schematic diagram illustrating the data structure of data recorded on a magnetic tape.

FIG. 4 illustrates the structure of data recorded on a magnetic tape 3, wherein FIG. 4(a) schematically illustrates one magnetic tape 3. In the present embodiment, as shown in FIG. 4(a), one magnetic tape 3 is divided into a plurality of partitions so that the magnetic tape 3 can be used in units of partitions. In this specific example of the system, the maximum allowable number of partitions of one magnetic tape is 256. The partitions are assigned partition numbers #0, #1, #2, #3, and so on, respectively, as shown in FIG. 4(a), and they are managed by these partition numbers.

Thus, in the present embodiment, data can be recorded or reproduced independently for each partition. More specifically, when data is recorded in a partition shown in FIG. 4(b), the data may be divided into a plurality of parts called groups each having a fixed length as shown in FIG. 4(c). That is, data is recorded on the magnetic tape 3 on a group-by-group basis.

The amount of data of one group corresponds to that of 20 frames. Herein, each frame is formed of two tracks as shown in FIG. 4(d), wherein two tracks of each frame are located adjacent to each other and one of the two tracks has a positive azimuth angle and the other track has a negative azimuth angle. Thus, each group consists of forty tracks.

Figure 5A:
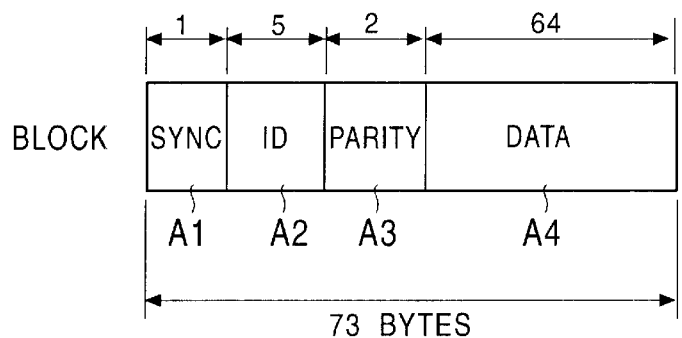
FIG. 5, consisting of FIGS. 5A through 5C is a schematic diagram illustrating the data structure of one track.
Figure 5B:
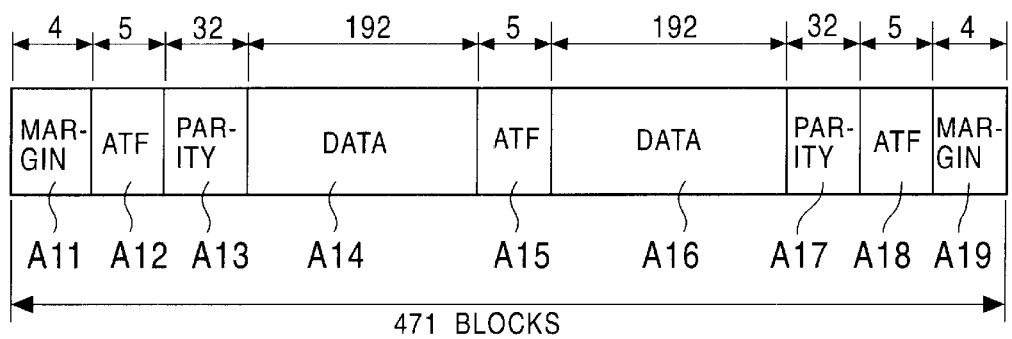

The structure of one track of data shown in FIG. 4(d) is shown in FIGS. 5A and 5B. FIG. 5A illustrates the data structure of one block. One block consists of a 1-byte SYNC data area A1, a 6-byte ID area A2 used for searching, a 2-byte parity area A3 used for error correction of the ID data, and a 64-byte data area A4.

One track of data consists of 471 blocks as shown in FIG. 5B, wherein each track also includes two 4-block margin areas A11 and A19 located at both ends of the track, respectively. An ATF (Automatic Track Following) area A12 is placed just after the margin area A11 and another ATF area A18 is placed just before the margin area A19. Furthermore, parity areas A13 and A17 are placed just after the ATF area A12 and just before the ATF area A18, respectively, wherein each parity area A13 and A17 includes thirty-two blocks.

An ATF area A15 is placed at the center of each track. Each of the ATF areas A13, A15, and A18 includes five blocks. Data areas A14 and A16 each including 192 blocks are placed between the parity area A13 and the ATF area A15 and between the ATF area A15 and the parity area A17, respectively. Thus, of 471 blocks of one track, 192×2=382 blocks in total are allocated to data areas (A14 and A16).

Figure 5C:
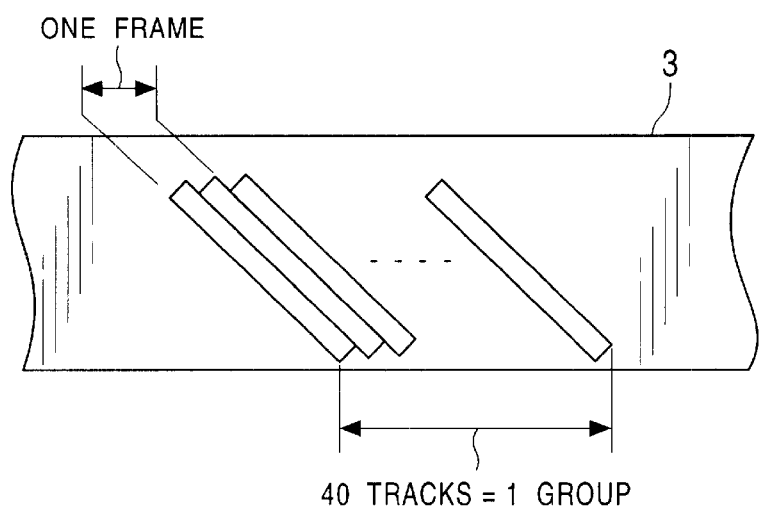

Tracks are formed on the magnetic tape 3, at physical locations as shown in FIG. 5C such that 40 tracks (=20 frames) form one group.

Figure 6:
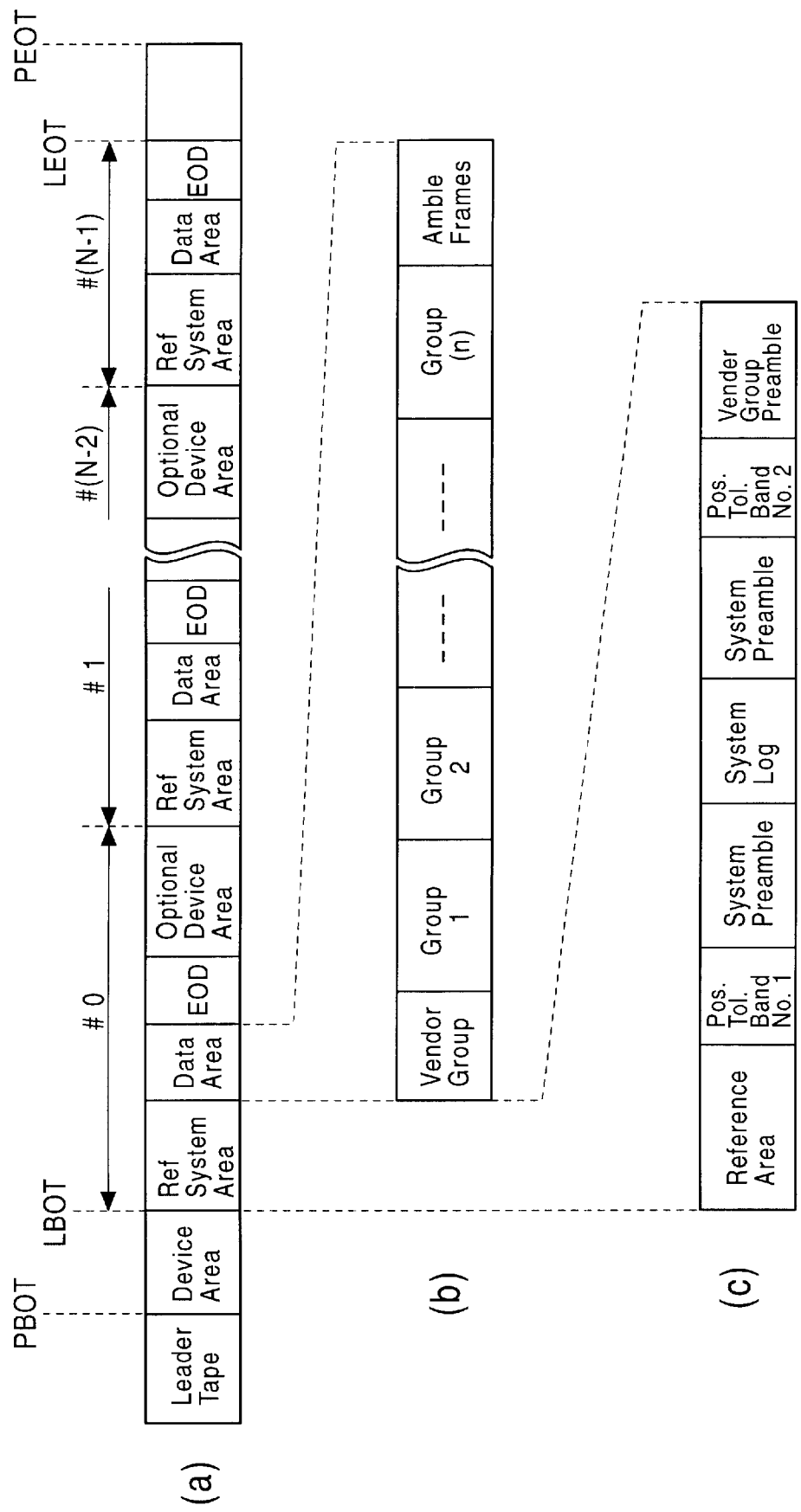
FIG. 6 is a schematic diagram illustrating the structure of areas on a magnetic tape.

FIG. 6 illustrates the structure of areas in which data is recorded on the magnetic tape 3 described earlier with reference to FIGS. 4 and 5.

In the specific example shown in FIG. 6, N partitions with partition numbers #0 to #(N−1) are formed.

As shown in FIG. 6(a), a leader tape is placed at a physical location just before the magnetic tape. At a location following the leader tape, a device area used to lead and unload the tape cassette is formed such that the beginning of the device area serves as a PBOT (Physical Beginning of Tape).

At a location following the device area, a reference area and a system area (hereinafter, the term "system area" is used to generically describe the area including both the reference area and the system area) associated with the partition #0 are placed. A data area is placed at a location following the system area. The beginning of the system area serves as an LBOT (Logical Beginning of Tape).

As illustrated in an enlarged fashion in FIG. 6(c), the system area includes a reference area, a first position tolerance band, a system preamble, a system log, a system postamble, a second position tolerance band, and a vender group preamble.

The data area following the system area includes, as illustrated in an enlarged fashion in FIG. 6(b), a vender group for storing information indicating the nation of a vender that produces and supplies data, and further includes a plurality of groups which are shown in FIG. 4(c) and which are represented as group 1 to group (n) in FIG. 6(b). At a location following the last group (n), an amble frame is placed.

At a location following the data area described above, an EOD (End of Data) code indicating the end of the data area is placed as shown in FIG. 6(a).

In the case where only one partition is formed, the end of the EOD area of that partition #0 becomes the logical end of tape (LEOT). In the specific example shown in FIG. 6, N partitions are formed, and thus an optional device area is placed following the EOD area of the partition #0.

The above-descried device area placed at the location just following the PBOT serves as an area used to load and unload the partition #0. Similarly, the optional device area placed at the location just following the end of the partition #0 serves as an area used to load and unload the partition #1.

In the partition #1, various areas are formed in a similar manner as in the partition #0, and another optional device area used to load and unload a following partition #2 is placed at a location following the end of the partition #1.

In this way, partitions #0 to #(N−1) are formed.

Note that there is no need to place an optional device area following the last partition #(N−1), and thus the end of the EOD area of the partition #(N−1) becomes the LEOT (Logical End of Tape).

A PEOT (Physical End of Tape) indicates the location of the physical end of the tape or indicates the physical end of a partition.

4. Data Structure of MIC

The data structure of the MIC 4 disposed in the tape cassette 1 is described below.

Figure 7:
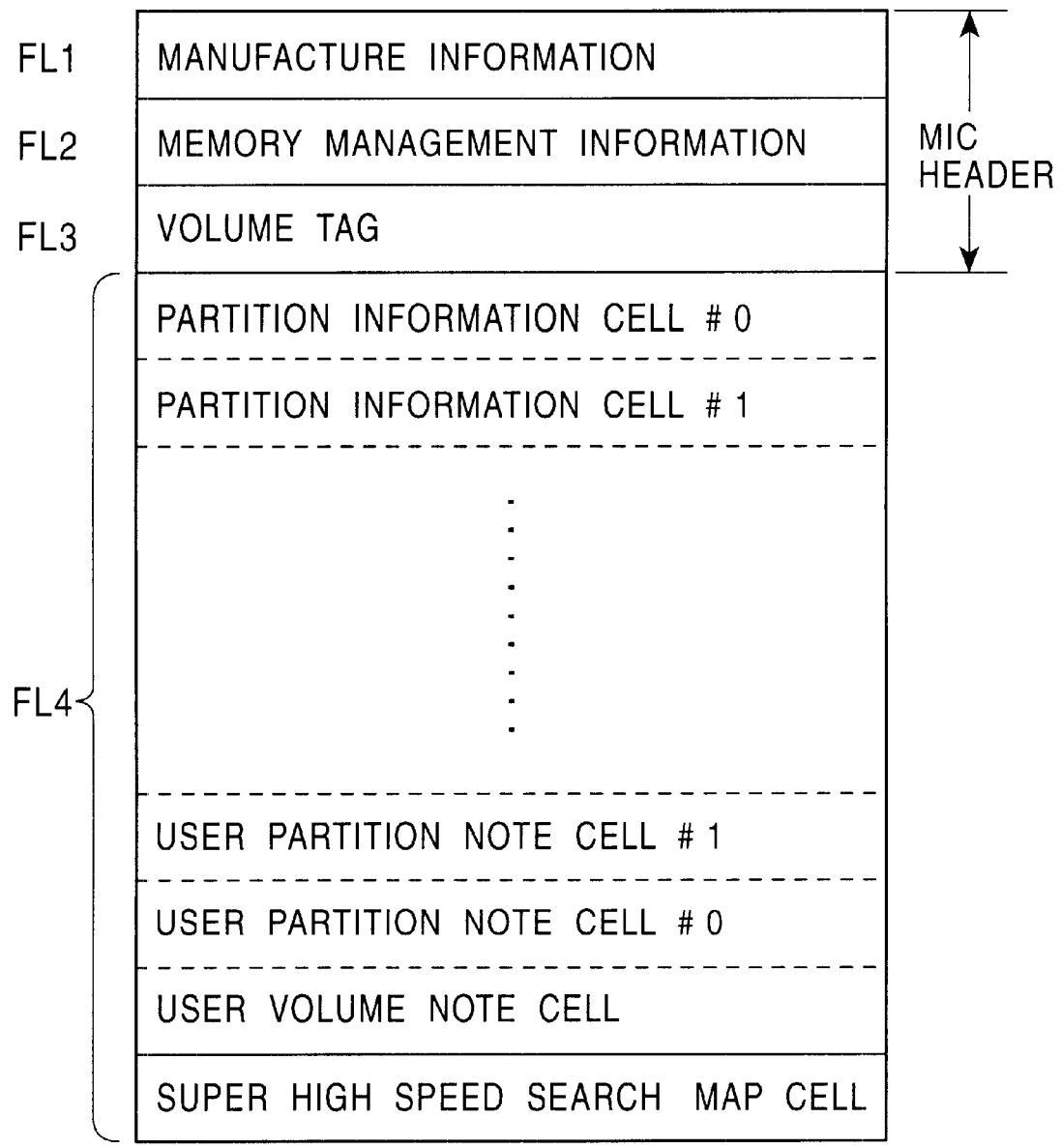
FIG. 7 is a schematic diagram illustrating the data structure of data stored in an MIC according to an embodiment of the invention.

FIG. 7 schematically illustrates an example of the data structure of data stored in the MIC 4. As shown in FIG. 7, the MIC 4 includes fields FL1 to FL4 serving as memory areas.

The fields FL1 to FL4 are used to store various kinds of information, such as information associated with production of the tape cassette, tape information associated with initialization, information associated with each partition, and so forth.

The field FL1 is used as a manufacture part for storing manufacture information including various kinds of information associated with the production of the tape cassette.

The field FL2 is used as a drive initialization part for storing memory management information, in particular, information as to initialization.

The field FL 3 serves as a volume tag for storing fundamental management information as to the tape cassette.

The field FL4 serves as a memory free pool in which additional management information may be stored. More specifically, in the memory free pool, information about the history of recording and reproducing operations and other various kinds of information are stored as required. Herein, each unit of data stored in the memory free pool is called a cell.

Management information associated with the respective partitions formed on the magnetic tape 3 is written in partition information cells #0, #1, . . . , formed successively in the memory free pool starting from the beginning thereof. That is, as many partition information cells are formed as there are partitions on the magnetic tape 3.

High speed search map information is written in a super high speed search map cell formed at the end of the memory free pool.

A user volume note cell is formed before the super high speed map cell, and user partition note cells are formed before the user volume note cell. The user volume note cell is used to store information such as a user note input by a user to describe general information about the tape cassette. On the other hand, information or notes associated with the respective partitions are stored in the corresponding user partition note cells. Note that information is stored in these cells when a user issues a write command, and thus it is not necessarily required that information be written in all cells.

The remaining middle area may be used as a memory free pool in which additional information may be written.

Figure 8:
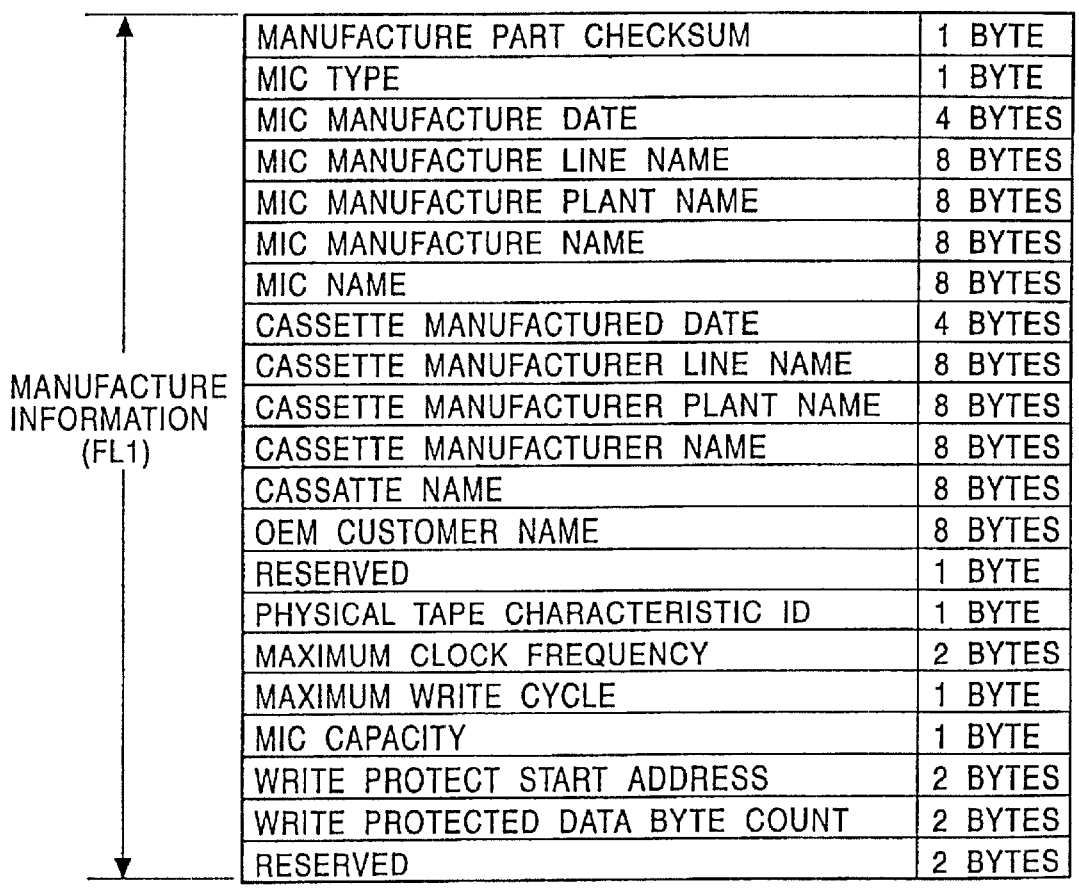
FIG. 8 is a schematic diagram illustrating a manufacture part of the MIC according to the embodiment of the invention.

FIG. 8 illustrates an example of the data structure of manufacture information stored in the field FL1, wherein the size of each data is also described on the right side of FIG. 8.

The first 1 byte of the manufacture information is used to store manufacture part checksum data indicating the checksum of data of the manufacture information. The manufacture part checksum is given when each cassette is produced.

In the remaining data area of the manufacture part, various kinds of information from an MIC type to a write protected data byte count are described. Herein, a reserved area shown in FIG. 8 is a data area reserved for future use. In the following description, reserved areas are used for similar purposes.

The MIC type is data indicating the type of the MIC actually disposed in the tape cassette.

An MIC manufacture date is data indicating the date (and also time) of producing the MIC.

An MIC manufacture line name is data indicating the name of a line where the MIC has been produced.

An MIC manufacture plant name is data indicating the name of a plant where the MIC has been produced.

An MIC manufacturer name is data indicating the name of the manufacturer of the MIC.

An MIC name is data indicating the name of the vender of the MIC.

Furthermore, a cassette manufacture date, a cassette manufacture line name, a cassette manufacture plant name, a cassette manufacturer name and a cassette name associated with the cassette itself are described in a similar manner as the data associated with the MIC.

An OEM customer name is data indicating the name of an OEM (Original Equipment Manufacturer) customer.

A physical tape characteristic ID is data indicating the physical characteristics of the tape such as the material of the tape, the thickness of the tape, and the length of the tape.

A maximum clock frequency is data indicating the maximum clock frequency which can be dealt with by the MIC.

A maximum write cycle is data indicating the number of bytes of data which is transferred at a time between the MIC and the tape streamer drive 10, wherein the maximum write cycle depends on the physical characteristics of the non-volatile memory employed as the MIC.

An MIC capacity is data indicating the storage capacity of the MIC.

A write protect start address is data used to designate a particular part of the MIC as a write-protected area by indicating the start address of a write-protected memory area.

A write protect byte count is data indicating the number of bytes of the write-protected memory area. That is, the area starting from the memory location indicated by the write protect start address and having a size indicated by the write protect count is designated as a write-protected memory area.

Figure 9:
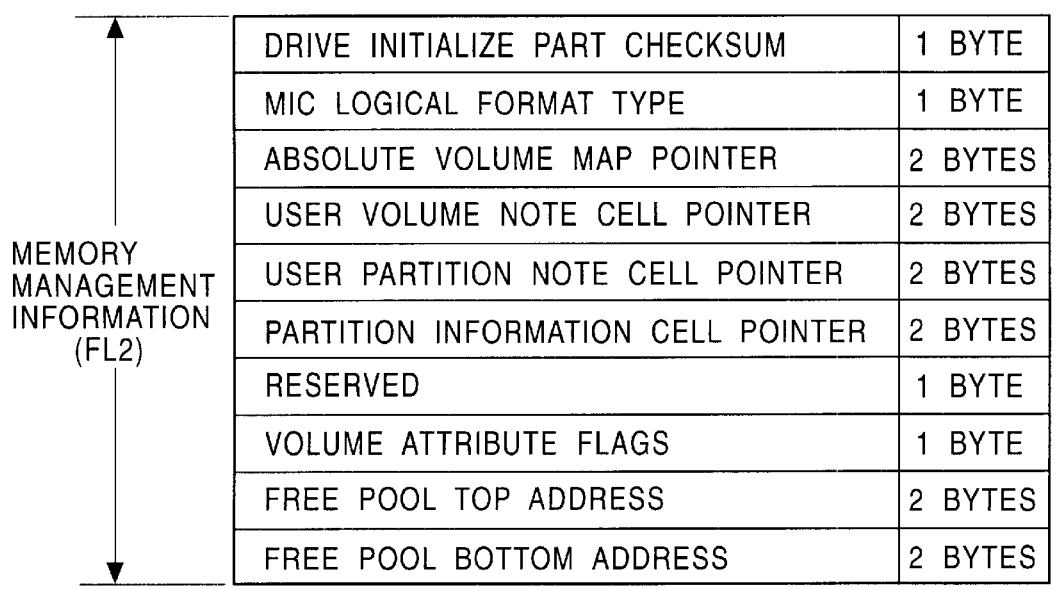
FIG. 9 is a schematic diagram illustrating a drive initialization part of the MIC according to the embodiment of the invention.

The structure of the field FL2 used to store memory management information is described below with reference to FIG. 9, wherein data sizes (in bytes) are also shown on the right side of the figure.

In the memory management information, a drive initialization part checksum is data indicating the checksum of data of the drive initialization part storing the memory management information.

In the remaining data area of the memory management information, various kinds of information from an MIC logical format type to a free pool bottom address are described.

More specifically, the MIC logical format type is data indicating the ID number of the logical format of the MIC. There are various MIC formats including a basic MIC format, a firmware update tape MIC format, a reference tape MIC format, and a cleaning cassette MIC format. The MIC logical format type indicates the ID number corresponding to a particular MIC format employed in the MIC tape cassette.

An absolute volume map pointer points to the start address of the absolute volume map information cell shown in FIG. 7.

A user volume note cell pointer indicates the start address of a memory area allowed to be used to store data as to the tape cassette via the SCSI, that is, the start address of the user volume note cell shown in FIG. 7.

A user partition note cell pointer indicates the start address of a memory area allowed to be used to store data as to the respective partitions, that is, the start address of the user partition note cell shown in FIG. 7. When there are a plurality of user partition note cells, the user partition note cell pointer indicates the start address of the first user partition note cell.

A partition information cell pointer indicates the start address of the partition information cell #0 shown in FIG. 7.

There are as many partition information cells written in the memory free pool as there are partitions formed on the magnetic tape 3, and all partition information cells #0 to #N are linked by pointers. More specifically, the address of the partition #0 is pointed to by the partition information cell pointer, and the address of any other partition is pointed to by a pointer stored in the immediately previous partition information cell.

As described above, the locations of various data in the field FL4 are managed by the respective pointers (absolute volume map pointer, user volume note cell pointer, user partition note cell pointer, partition information cell pointer).

A volume attribute flag is a 1-byte flag used as a logical write protect tab of the MIC 4. More specifically, the MIC header flag indicates whether writing into the manufacture part is allowed or prohibited or indicates whether writing into the part other than the manufacture part is allowed or prohibited.

A free pool top address and a free pool bottom address indicate the start address and the end address, respectively, of the memory free pool currently set in the field FL2. The area of the memory free pool varies in response to various operations such as writing or deleting of partition information or a user partition note. When the area of the memory free pool varies, the free pool top address and/or the free pool bottom address are updated in accordance with the variation.

The structure of the volume tag stored in the field FL3 shown in FIG. 7 is now described below with reference to FIG. 10, wherein data sizes (in bytes) are also shown on the right side of the figure.

In an area at the beginning of the volume tag, is stored a volume information checksum indicating the checksum of volume information data describing fundamental management information associated with the tape cassette.

An accumulative partition information checksum indicates the checksum of accumulative partition information data describing the history of the tape cassette starting from the production of the tape cassette.

Following the volume note checksum and the volume note, a cartridge serial number represented by, for example, 32 ASCII code characters is stored to indicate the serial number.

A manufacturer ID is a manufacturer identifier indicating the code number of the manufacturer of the tape cassette.

A secondary ID is a secondary identifier indicating an attribute of the tape cassette 1 using, for example, a 1-byte code.

A cartridge serial number part checksum indicates the checksum of the cartridge serial number, the manufacturer ID, and the secondary ID.

Specific volume tags 1 to 13 are reserved areas each consisting of, for example, 36 bytes.

The cells stored in the field FL4 shown in FIG. 7 are described below.

As described earlier, various cells such as the partition information cell and the user partition note cell are stored in the field FL4.

Figure 11:
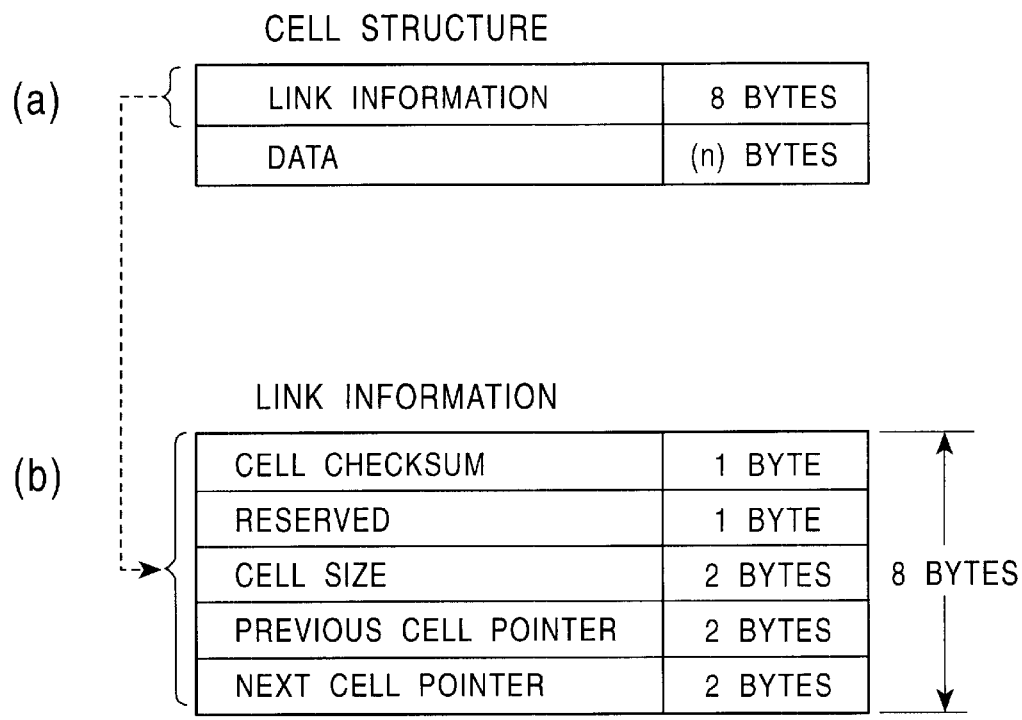
FIG. 11 is a schematic diagram illustrating the cell structure of the MIC according to the embodiment of the invention.

FIG. 11 illustrates the structures of the respective cells.

As shown in FIG. 11(a), one cell is formed of 8-byte link information and data including n bytes (the number of bytes varies depending on the type of the cell).

8-byte link information having the structure shown in FIG. 11(b), is provided in each cell.

As shown in FIG. 11(b), the link information includes a 1-byte cell checksum indicating the checksum of data in the cell.

Furthermore, in the link information, a 2-byte cell size is used to describe the size of the cell.

A previous cell pointer and a next cell pointer are actual linkage data (indicating the link structure). When a plurality of cells of the same type are linked to one another, previous and next cells are pointed to by the previous cell pointer and the next cell pointer, respectively.

Cells having such a structure include the partition information cell, absolute volume map information cells, user volume note cells, and user partition note cells. In the case of partition information cells, the cell size is fixed. The cell sizes of the other types of cells are variable.

The partition information cell with the fixed cell size is described below with reference to FIGS. 12 and 13.

Figure 12:
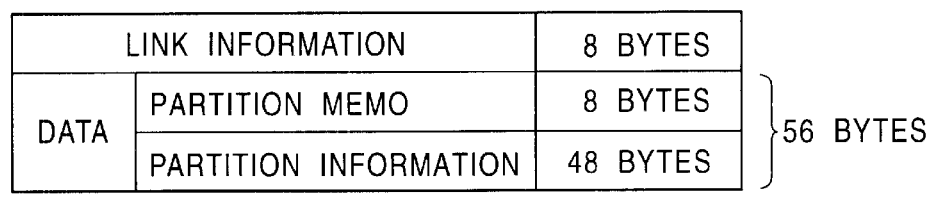
FIG. 12 is a schematic diagram illustrating a partition information cell of the MIC according to the embodiment of the invention.

The partition information cell is formed of 8-byte link information and 56-byte data, as shown in FIG. 12. Of the 56-byte data, 8 bytes are used to describe a partition memo, and the remaining 48 bytes are used to describe partition information.

The partition information (system log) describes the history of use of the magnetic tape's partition corresponding to the cell and is used by the tape streamer drive to manage the recording/reproducing operation.

The data structure of partition information in one partition information cell corresponding to a certain partition is defined, for example, as shown in FIG. 13.

4-byte previous-groups-written data indicates the number of groups in the partition which have been physically recorded on the magnetic tape after the partition information was last updated.

4-byte total-groups-written data indicates the total number of groups which have been recorded in the partition. This value is accumulated until the tape cassette becomes unusable after expiration of the life-time or until it is discarded.

The previous-groups-written data and the total-groups-written data are incremented by the system controller 15 of the tape streamer drive in accordance with the number of groups which are newly recorded during a process in which data is recorded on the magnetic tape 3 by the tape streamer drive.

3-byte previous-groups-read data indicates the number of groups which have been read after the partition information was last updated.

4-byte total-groups-read data indicates the total number of groups which have been read from the partition.

3-byte total-rewritten-frames data indicates the accumulative number of frames of the partition which have been requested for rewriting data via a READ-AFTER-WRITE (hereinafter abbreviated as RAW) command.

In the present tape streamer drive, an RAW operation is performed by reading data via the reproducing head 13C immediately after the data has been written on the magnetic tape 3. The data of a frame read via the RAW process is then subjected to error detection performed by the system controller 15. If an error is detected, the recording system is controlled so that the data of the frame including the error is rewritten. The total-rewritten-frames data indicates the accumulative number of frames which have been rewritten in the above-described manner.

3-byte total 3rd ECC count data indicates the accumulative number of groups in the partition which have been error-corrected using C3 parities.

In the present tape streamer drive system, data read from the magnetic tape 3 is subjected to data correction by means of C1, C2, and C3 parities, wherein a C3 parity is used only when an error cannot be corrected using C1 and C2 parities.

4-byte access count data indicates the number of accesses performed by the tape streamer drive to the partition on the magnetic tape. Herein, the number of accesses refers to the number of times that the partition of interest has physically passed. Thus, the number of accesses indicated includes the number of recording and reproducing operations associated with the partition and the number of times that the partition has simply passed under either head.

4-byte update replace count data indicates the accumulative number of times that data in the partition of the magnetic tape has been rewritten by means of updating. That is, the update replace count data indicates the number of times that data in the partition has been updated.

2-byte previous-rewritten-frames data indicates the number of frames in the partition which have been requested for rewriting data via the RAW process after the partition information was last updated.

2-byte previous 3rd ECC count data indicates the accumulative number of groups in the partition which have been error-corrected using C3 parities after the partition information was last updated.

3-byte load count data indicates the accumulative number of times that the tape has been loaded.

The frames are assigned successive numbers in such a manner that the first frame at the beginning of the partition is assigned, for example, #1, and the following respective frames are assigned successive numbers. Herein, the number assigned to each frame is called a frame number.

3-byte valid maximum absolute frame count data indicates the total number of valid frames contained in the partition, that is, the maximum frame number.

This value is updated if the end position of the data area is changed when data in the partition is updated.

In contrast, 3-byte maximum absolute frame count data stored at the end of the partition information indicates the total number of all frames contained in the partition. That is, the maximum absolute frame count data indicate the frame number of the last frame (having the greatest frame number) of all frames contained in the partition.

Once a partition has been formed, for example, by means of preformatting, the maximum absolute frame count data is fixed at a value corresponding to the partition size, and the value is not rewritten.

In other words, the maximum absolute frame count data indicates the total number of frames forming the present partition, and thus this data corresponds to "maximum frame number data" described earlier with reference to the conventional technique.

In contrast, the valid maximum absolute frame count data indicates the total number of frames contained in a valid area of the present partition, that is, in an area starting from the beginning of the present partition to the end of the EOD area indicating the end of the current valid data area. Therefore, if the value of the maximum absolute frame count data is denoted by MAFN and the value of the valid maximum absolute frame count data is denoted by VMAFN, then $$MAFN \geq VMAFN$$

In the present embodiment, as described above, the maximum frame number of frames in the valid area as well as the maximum frame number of frames in the partition is set in the management information associated with the MIC 4. Furthermore, in the present embodiment, the remaining available storage capacity of the partition is determined using the maximum absolute frame count data and the valid maximum absolute frame count data as will be described later.

The partition information also includes flag bytes wherein the respective bits of the flag bytes are defined as follows.

That is, a prevent write flag indicates whether writing of data into the partition is allowed or prohibited, a prevent read flag indicates whether reading of data from the partition is allowed or prohibited, a prevent write retry flag indicates whether rewriting of data into the partition via an RW process during a recording operation is allowed or prohibited, and a prevent read retry flag indicates whether a retry of reading data from the partition via an RAW process during a reproducing operation is allowed or prohibited.

The flag bytes also include a partition-is-opened flag which is set during an operation of recording data into the partition and reset at the end of the recording operation.

The super high speed search map cell located at the end of the field FL4 has a cell structure including link information as shown in FIG. 14. The super high speed map cell stores data map information required to achieve a high speed searching capability using the performance of the reel motor in a most effective fashion without having to obtain ID information in real time from the magnetic tape 3.

The high speed searching is performed using the super high speed search map cell as follows. For example, logical location information is written in the high speed search map each time the tape runs 10 m during an operation of recording data on the magnetic tape 3. When the magnetic tape 3 is searched for a particular file location, the map is first examined so as to select a location, which is closest to and before the target location and which has a sufficient margin, from the locations marked at intervals of 10 m. Because the tape thickness and the reel diameter are known, it is possible to move the tape to the selected location by counting reel FG pulses without having to read the tape IDs. That is, it is possible to drive the tape at a high speed at which IDs cannot be read from the magnetic tape. When the selected location has been reached by means of the high speed driving, the running speed of the magnetic tape 3 is reduced to a level at which ID data can be read, and usual high speed searching is performed until the target file location designated by the host computer is found.

The data structure of the MIC 4 has been described above with reference to FIGS. 6 to 14. Note that the data structure of the MIC 4 described above is only one example, and the data locations, the data areas, the data contents, the data sizes, and other parameters are not limited to those described above.

5. Management of Remaining Available Recording Area

In the present embodiment, the remaining available recording area in each partition can be managed in accordance with the valid maximum absolute frame count data and the maximum absolute frame count data defined in the partition information of the MIC 4, and the size of the remaining available area (the remaining available storage capacity) can be determined from the above data.

The manner of managing the remaining available recording area in the partition according to the present embodiment is described below. In the following description, the valid maximum absolute frame count data and the value thereof will also be represented by VMAFN, and the maximum absolute frame count data and the value thereof will also be represented by MAFN.

Figure 15:
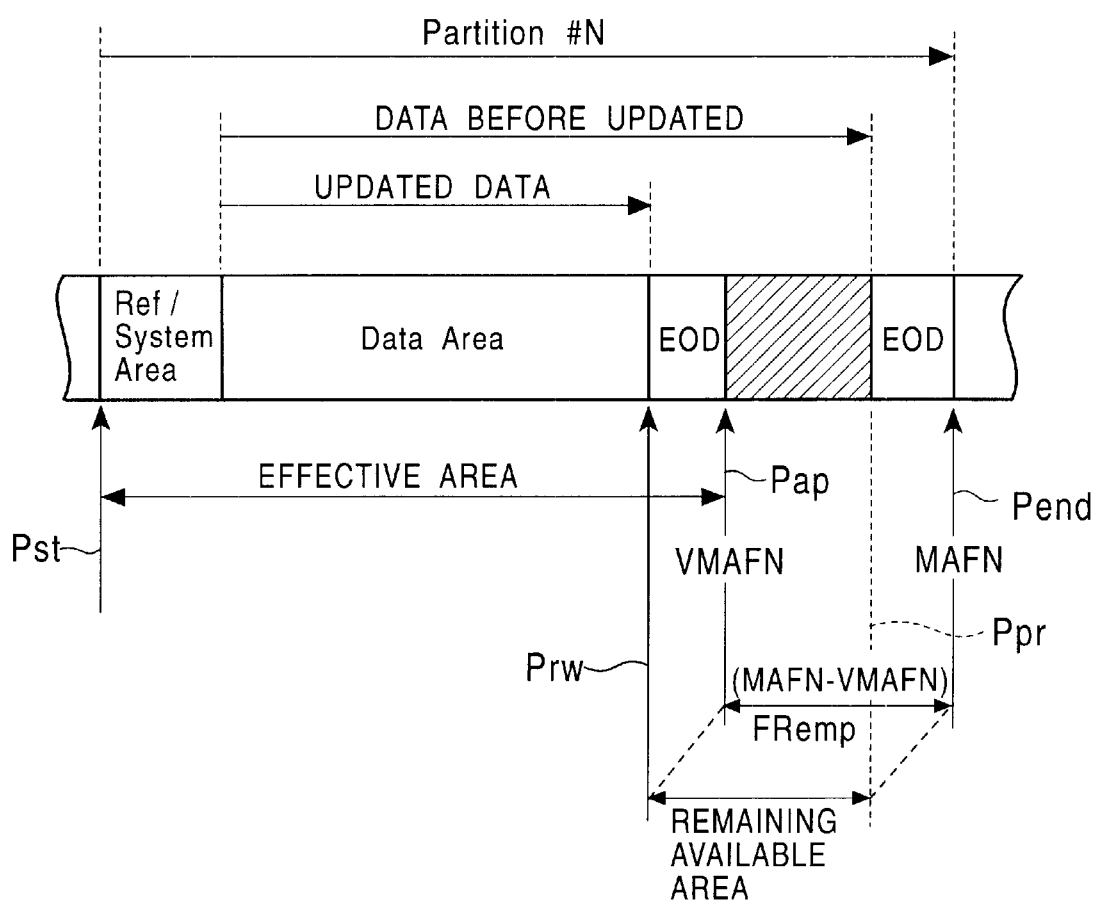
FIG. 15 is a schematic diagram illustrating the concepts of calculating the size of a remaining available recording area managing the remaining available recording area according to an embodiment of the invention.
Figure 17:
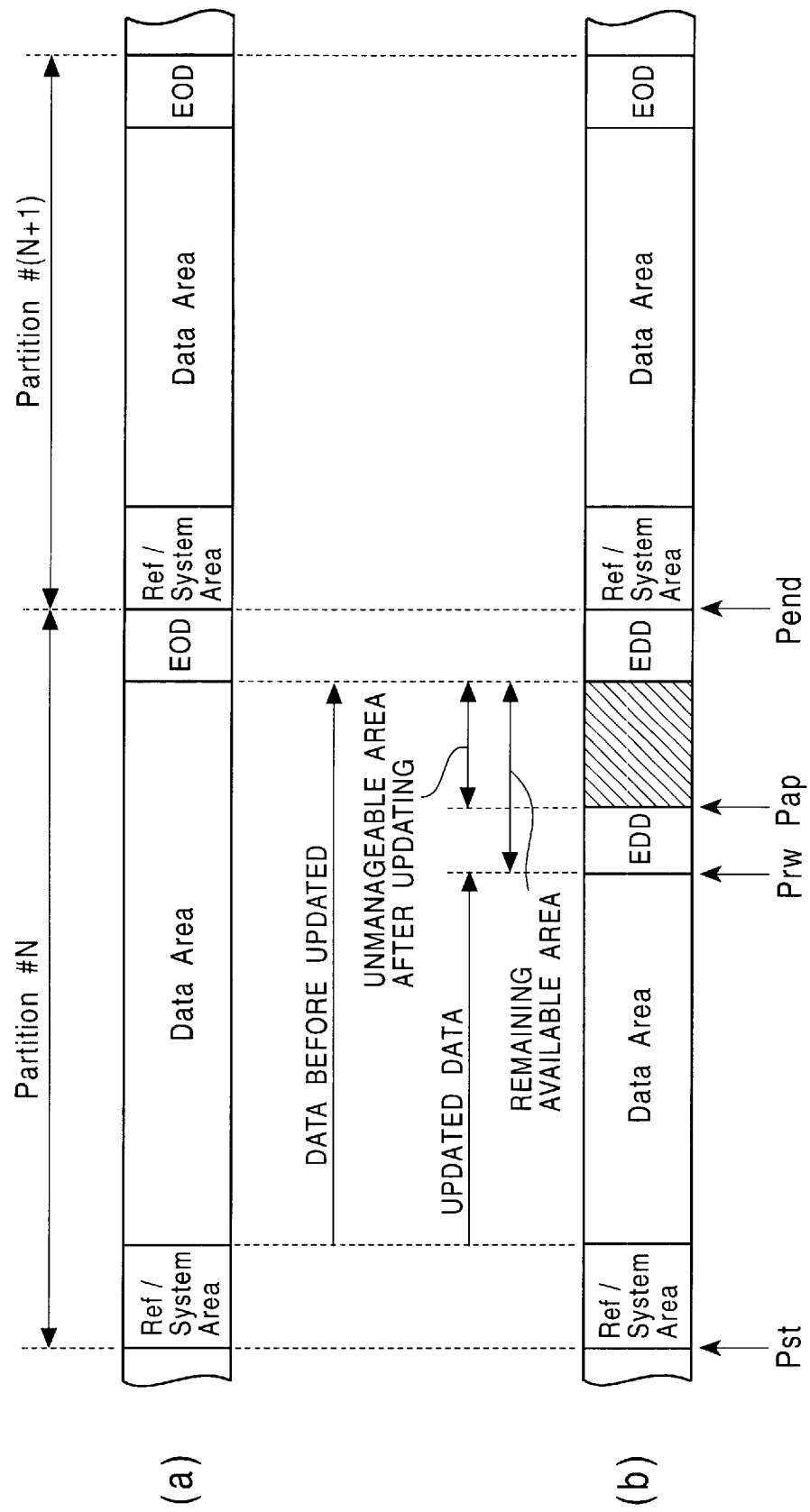
FIG. 17 is a schematic diagram illustrating an example of a manner in which data is rewritten in a particular partition.

FIG. 15 illustrates the same partition #N of the magnetic tape as that shown in FIG. 17(b). As described above, the structure of the partition is illustrated in a simplified fashion, and thus there is a slight difference from the actual structure. For example, the optical device areas described above with reference to FIG. 6 are not shown in FIG. 15.

If the MAFN described above is applied to FIG. 15, the MAFN indicates the frame number of a frame located at the end position Pend of the partition #N.

In FIG. 15, the valid area of the partition #N refers to an area from the starting position Pst of the partition to a position Pap. That is, the valid area includes data area formed in the partition by latest updated data, system areas located before and after the data area, and the EOD area.

As described earlier, the VMAFN indicates the maximum frame number of frames in the partition. Thus, in the example shown in FIG. 15, the VMAFN indicates the frame number of a frame located at the end position Pap of the valid area.

Thus, in the present embodiment, both the MAFN indicating the maximum frame number of all frames in the partition and the VMAFN indicating the maximum frame number of frames in the valid area are defined.

This makes it possible to manage the area as the remaining available recording area formed by frames having frame numbers following the frame number indicated by the VMAFN, wherein that area cannot be managed by only the VMAFN.

Furthermore, as can be also seen from FIG. 15, it is possible to determine the number of frames FRemp forming the area from a location just after the end position Pap of the valid area to the end position Pend of the partition #N (that is, the remaining available recording area) by perform the following calculation:

$$MAFN-VMAFN=FRemp \qquad (1)$$

Although it has been stated above that the area formed of frames having frame numbers following the number indicated by the VMAFN can be regarded as the remaining available recording area, the effective remaining area actually available for recording data is slightly different.

For example, when data is added to the updated data area shown in FIG. 15, the data is recorded starting from the tape position Prw while deleting the area following the tape position Prw, including the EOD area and the data area (hatched area) before being updated. If the entire recording area of the partition #N is written with data, then the EOD formed following the data area such is located at the end of the partition #N as shown in FIG. 17(a).

This means that the effective remaining available recording area in the partition #N is an area from the position Prw at the end of the data area to the end position Ppr of the data area before updated as can be seen from FIG. 15.

On the other hand, as also can be seen from FIG. 15, the number of frames FRemp calculated by equation (1) indicates the number of frames located in the area starting from a position just after the end position Pap of the valid area to the end position Pend of the partition. However, the size of this area is equal to the size of the effective remaining available recording area in the partition #N. Thus, the number of frames FRemp also indicates the number of frames forming the effective remaining available recording area in the partition #N.

As described earlier with reference to FIG. 5, 1 frame=2 tracks and 1 track=471 blocks, wherein the size of one block is equal to 73 bytes. Therefore, the size L of the remaining available recording area (remaining available storage capacity) of the partition can be determined by $$L=73 \times 471 \times 2 \times FRemp \qquad (2)$$

6. Example of Operation of Transmitting Information Indicating the Size of a Remaining Available Recording Area In the present embodiment, the size of a remaining available recording area in each partition can be determined as described above in a conceptual fashion. The manner of determining the size of a remaining available recording area is described in further detail below with reference with a specific example in conjunction with FIG. 16.

Figure 16:
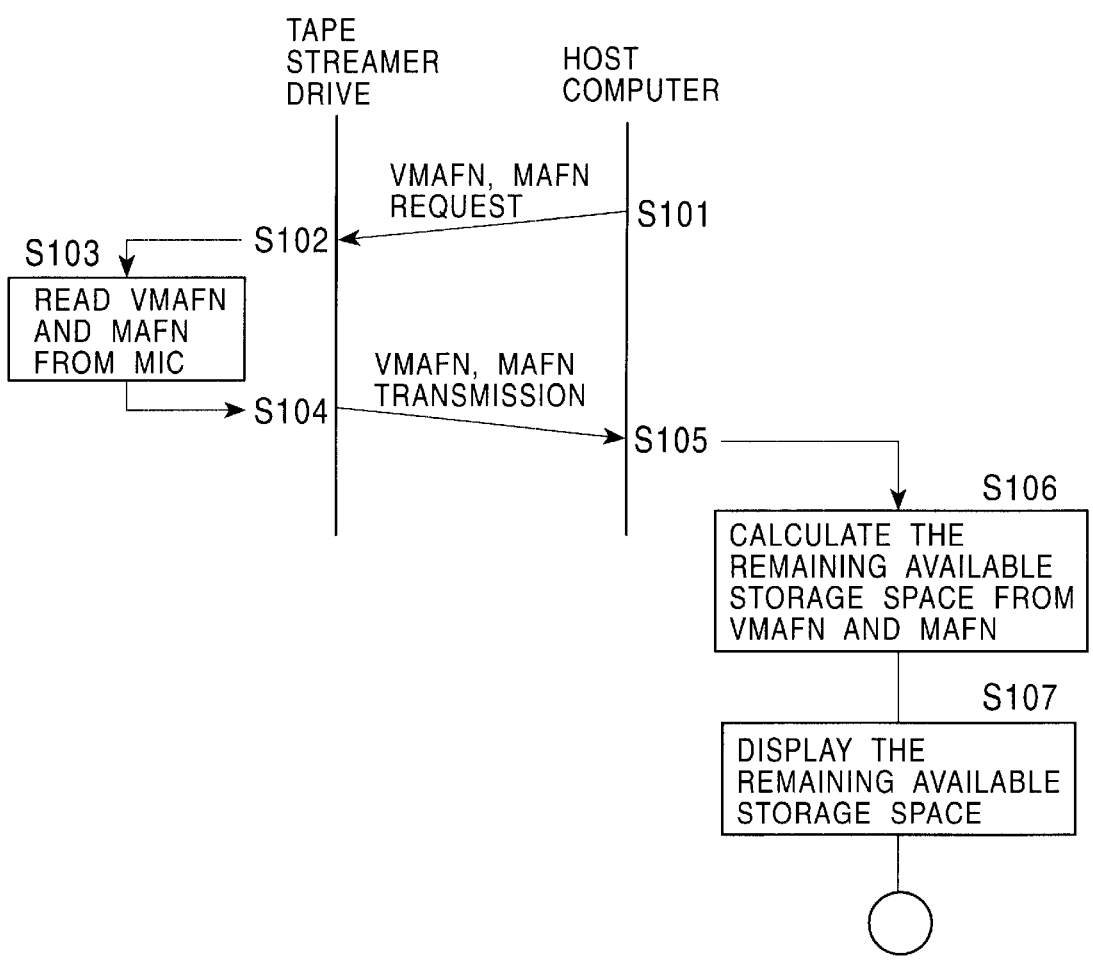
FIG. 16 is a schematic diagram illustrating an example of an operation performed by a host computer to determine the size of a remaining available recording area of a partition.

FIG. 16 is a state transition diagram associated with a process performed by application software running on the host computer 40 to determine the size of a remaining available recording area in a present partition of interest of a tape cassette currently loaded on the tape streamer drive 10 and inform a user of the resultant size, for example, by displaying the result on a display.

If the user inputs a command into the host computer 40 to display the remaining available storage capacity of a particular partition, then the particular application software running on the host computer 40 performs an operation in response to the command as follows. That is, in step S101 in FIG. 16, the application software transmits a command to the tape streamer drive 10 to request transmission of the VMAFN and the MAFN associated with the partition. In the above operation, the transmission of the command is performed via the SCSI bus. In the following description, the operation of the host computer 40 is executed by the particular application software described above.

In step S102, the system controller 15 of the tape streamer drive 10 receives the above-described command via the SCSI interface 20.

In response to receiving the command, an internal process is performed in step S103 to read the VMAFN and the MAFN corresponding to the designated partition number from the MIC 4 of the currently loaded tape cassette 1.

In the next step S104, the VMAFN and the MAFN read from the MIC 4 are transmitted to the host computer 40 according to the transmission format of the SCSI via the SCSI interface and the SCSI bus.

In step S105, the host computer 40 receives the VMAFN and the MAFN transmitted from the tape streamer drive 10 and stores then in an internal RAM.

In the next step S106, the host computer 40 performs the calculation according to equations (1) and (2) using the VMAFN and the MAFN stored in the RAM thereby determining the remaining available storage capacity of the partition. When the host computer 40 performs the above calculation, it is required that the data size per block (or data size per frame) be known. The data indicating the data size per block may be stored in advance in the application software executed on the host computer, or information about the data size may be transmitted together with the VMAFN and the MAFN from the tape streamer drive 10 at a proper time.

In the next step S107, the remaining available storage capacity obtained in step S106 is subjected to a predetermined process so that it can be visually displayed in a predetermined form on a display device.

In the above process, communication between the host computer 40 and the tape streamer drive 10 according to the communication format of the SCSI interface has been described in a simplified fashion.

Although in the above-described process, the host computer 40 calculates the remaining available storage capacity using the received VMAFN and MAFN, the process may also be performed as follows.

First, the host computer 40 issues a request for notification of the remaining available storage capacity of a designated partition. In response to receiving the notification request, the tape streamer drive 10 reads the VMAFN and the MAFN corresponding to the designated partition from the MIC 4 and calculates the remaining available storage capacity. The data indicating the calculated remaining available storage capacity is then transmitted to the host computer 40.

Note that the process shown in FIG. 16 is one of examples which are performed using the VMAFN and the MAFN, and various processes may also performed using the VMAFN and the MAFN.

The inventors of the present invention have previously proposed a system in which communication between the MIC 4 and the system controller 14 is performed by means of a wireless technique. The present invention may also be applied to such a system.

Although in the embodiment described above, the 8-mm VTR tape cassette is used as the recording medium in the tape streamer drive, the present invention may also be applied to a tape streamer drive which uses another type of tape cassette as the recording medium, as long as the cassette including the tape-shaped recording medium also includes a memory capable of storing management information in a nonvolatile fashion.

What is claimed is:

1. A recording medium comprising:

a tape cassette including a magnetic tape disposed therein; and a memory disposed in said tape cassette, for storing management information used to manage recording or reproducing data onto or from said magnetic tape, wherein said memory includes a memory area means for storing first unit recording area number information indicating the maximum number of successive numbers assigned to unit recording areas of each partition when one or more partitions including successive unit recording areas with a predetermined fixed length are formed on said magnetic tape; and said memory area means for storing second unit recording area numbers information indicating the maximum number of successive numbers assigned to unit recording areas forming a valid area in a partition in which valid data is recorded.

2. The recording medium according to claim 1, wherein the memory area means contains a high speed storage means for allowing a high speed search to be conducted on the magnetic tape.

3. A tape drive apparatus comprising:

tape drive means for recording or reproducing information onto or from a magnetic tape when a tape cassette includes said magnetic tape disposed therein is loaded; and memory drive means for reading or writing management information from or into a memory if said loaded tape cassette includes said memory for storing management information used to manage recording or reproducing data onto or from said magnetic tape, wherein when one or more partitions including successive unit recording areas with a predetermined fixed length are formed on said magnetic tape, said memory drive means writes into said memory first unit recording area number information indicating the maximum number of successive numbers assigned to the unit recording areas of each partition and second unit recording area number information indicating the maximum number of successive numbers assigned to the unit recording areas forming a valid area in a partition in which valid data is recorded.

4. A tape drive apparatus according to claim 3, wherein said memory drive means, in response to receiving a predetermined command, reads said first unit recording area number information and said second unit recording area number information associated with a particular partition from said memory.

5. A tape drive apparatus according to claim 3, wherein said first unit recording area number information and said second unit recording area number information associated with a particular partition and read by said memory drive means are used to calculate the size of a remaining available recording area in said particular partition.

6. A tape drive apparatus according to claim 3, wherein said unit recording area is a frame including a predetermined number of tracks successively formed on said magnetic tape.

* * * * *